310-334 SR

PTU03 XR 4,308,547

[11] 4,308,547

Lovelady et al. [45] Dec. 29, 1981

[54] LIQUID DROP EMITTER

[75] Inventors: Kenneth T. Lovelady; Larimore F. Toye, both of Irving, Tex.

[73] Assignee: Recognition Equipment Incorporated, Irving, Tex.

[21] Appl. No.: 106,601

[22] Filed: Dec. 26, 1979

Related U.S. Application Data

[63] Continuation of Ser. No. 895,882, Apr. 13, 1978, abandoned.

[51] Int. Cl.³ .......... G01D 15/18

[52] U.S. Cl. .......... 346/140 R; 310/371

[58] Field of Search .......... 346/140, 75; 239/4, 239/102; 400/126; 310/366, 371

[56] References Cited

U.S. PATENT DOCUMENTS

| | | | |
|---|---|---|---|
| 2,512,743 | 6/1950 | Hansell | 346/140 X |
| 2,645,727 | 7/1953 | Willard | 310/371 X |
| 2,925,312 | 2/1960 | Hollmann | 346/140 X |
| 3,211,088 | 10/1965 | Naiman | 346/140 X |
| 3,277,566 | 10/1966 | Christensen | 239/4 X |
| 4,005,435 | 1/1977 | Lundquist | 346/75 X |
| 4,046,073 | 9/1977 | Mitchell | 346/1 X |
| 4,068,144 | 1/1978 | Toye | 346/75 X |

FOREIGN PATENT DOCUMENTS 547556 5/1977 U.S.S.R. .

OTHER PUBLICATIONS

Krause, K. A., Focusing Ink Jet Head, IBM TDB, vol. 16, No. 4, Sep. 1973, p. 1168.

Jablonski, R. B.; Pneumatic Ink Printing, IBM TDB, vol. 17, No. 2, Jul. 1974, pp. 402-403.

Mitchell et al.; Ink on Demand . . . Printing; IBM TDB, vol. 18, No. 2, Jul. 1975, pp. 608-609.

*Primary Examiner*—Joseph W. Hartary
*Attorney, Agent, or Firm*—John E. Vandigriff

[57] ABSTRACT

A liquid drop emitter utilizing acoustical principles ejects liquid from a body of liquid onto a moving document to form characters or bar codes thereon.

3 Claims, 7 Drawing Figures

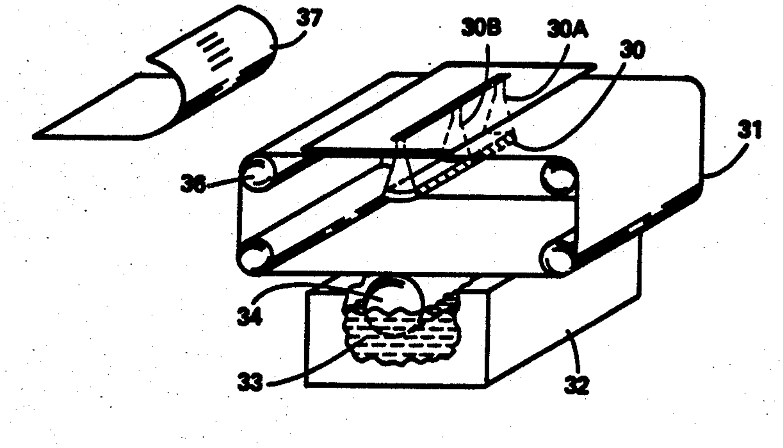
FIG. 4
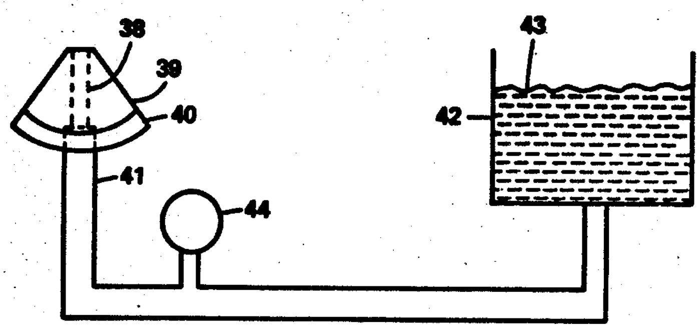
FIG. 5
| DROP DIRECTION | DRIVE BETWEEN 16 AND |
|---|---|
| A | 17 |
| B | 17&18 |
| C | 18 |
| D | 18&19 |
| E | 19 |
FIG. 2c

LIQUID DROP EMITTER

This is a continuation of application Ser. No. 895,882 filed Apr. 13, 1978 now abandoned.

Field of the Invention

This invention relates to drop emitters such as those used in ink-jet printers and more particular to nozzleless liquid drop emitters.

PRIOR ART

Present day ink-jet printers use a nozzle through which a stream of fluid passes. By vibrating the nozzle or modulating the fluid pressure at a desired frequency the stream is broken into droplets which are then impacted against a moving surface on which information is to be printed. Some of the present ink-jet printers are of the continuous stream type which require pressurized ink reservoirs or ink pumps which can be sources of particulate contamination sufficient to clog the nozzle. The drop frequency range generally utilized by this type of ink-jet printer is 25 kHz to 120 kHz typically, and the operating frequency, once chosen by design, is fixed. It is either wasteful of ink or requires capture and recirculation of unused drops. It also requires drop deflection means.

The other major type of present ink-jet printer is that which produces drops on command. Essentially no ink reservoir pressure is required and each drop produced is used for printing. The maximum drop frequency of this type of ink-jet printer is typically about 4 kHz or less primarily because of limitations imposed by the fluid dynamics concerning refilling the nozzle tip after drop ejection and by the fact that a minimum finite time is also required to produce enough energy by state of the art means to emit a drop. Drop deflection means are not required. Both of these types of ink-jet printers require nozzles which are typically subject to the field problem of clogging. The attainment of suitable geometrical nozzle uniformity and alignment, particularly in a multi-nozzle array, is a problem in manufacturing.

As early as 1927 R. W. Wood and A. L. Lumis reported the "fountain effect" at the liquid to air interface in the presence of an intense ultrasonic beam. The fountain effect is that of an incoherent stream of random sized drops being ejected above the liquid surface and the generation of fog is commonly present. R. W. Wood and A. L. Lumis, Ph.L/Mag.S7 4(2), 417–436 (1927). In 1935 J. Gruetzmacher conducted experiments using curved crystals to focus a beam of ultrasonic energy. Ultrasonics by Benson Carlin, McGraw-Hill 1960 page 61 refers to reference containing J. Gruetzmacher original work published in Z.physik, 96(1935).

While there has been some work in these related areas, there has been no application to printing utilizing the fountain effect of a liquid in the presence of an ultrasonic beam.

SUMMARY OF THE INVENTION

Synchronous, fog free droplets have been emitted from the surface of a liquid at the liquid air interface. During the production of droplets, surface waves are produced. It is necessary to damp these surface waves. The surface waves are caused by the separation disturbance of an ejected drop and, to a lesser extent, fluid replenishment of the area. It has been found that either wire or cloth mesh used at the liquid interface will damp the surface waves. Drop rates have also been selected which are synchronous with the natural resonant frequency of the surface waves produced by the drop formation so that it aids in the drop formation rather than interfere.

One of the key elements in a successful generation of drops is the method of exciting the piezoelectric crystal which is used to produce the sonic energy. Fog and droplets are produced at the air liquid interface by exciting a crystal below the surface of the liquid with a continuous wave powerful enough to produce an energy density greater than three watts rms/cm$^2$ at the liquid/air interface. The exact power threshold is a function of the fluid properties. The energy density is equal to the radiation pressure. Radiation pressure is a DC component of acoustic pressure and acts like an ultrasonic wind. In the continuous wave mode, the liquid is blown up first into a small mound at low intensity and into a taller and taller mound as the radiation pressure is increased. Then at about three wrms/cm$^2$ for water, the radiation pressure forces exceed the surface tension forces, and a drop of liquid is thrown into the air. Since the radiation pressure is DC, this action continues and drops are randomly formed in a continuous manner.

To progress from random drop formation to a synchronous, uniform, predictable emission, the RF crystal excitation frequency is modulated. Several techniques may be used. For example, FM modulation where the frequency sweeps in and out of the crystal thickness resonance, thus modulating the power of the radiation pressure as a function of the system Q. Drops are emitted at the FM sweep rate.

Another method is AM modulation where the amplitude of the power to the crystal is varied, thus varying the radiation pressure. The RF carrier is operated at crystal resonance and drops are formed at the amplitude modulation rate.

In another method, burst mode modulation is used. Burst mode is the gating out a burst of full amplitude RF energy at the crystal thickness resonance frequency. One drop is generated for each burst provided the burst duration is short. Drop rate becomes the number of bursts per second.

Another possible method of exciting the crystal is by pulsing. A high voltage fast rise time pulse is used which excites the crystal in the fundamental thickness resonance mode and all its harmonics with additional acoustic energy radiation produced by energy in the harmonics.

Utilizing the above principle, a nozzleless liquid drop emitter may be used to create droplets of fluid, ink for example, for use in nozzleless ink-jet printers, several examples of which are discussed below.

DESCRIPTION OF THE DRAWING

For a complete understanding of the present invention and technical advance represented thereby, reference is now made to the following description taken in conjunction with the accompanying drawings in which:

FIG. 2*c* is a table showing the relationship between the droplets and the driving contacts;

FIG. 4 is another embodiment of the present invention used to print bar codes; and, FIG. 5 is a further embodiment of the present invention using a concentrator centrally bored for ink feed.

The nozzleless liquid emitter has an obvious advantage over other non-impact printers such as ink-jet printers. There are no nozzles to clog or shoot crocked or to be sized incorrectly. The charger, deflection system, ink catcher, phase control, and electronics associated with these can be eliminated if multiple emitters are used. A nozzleless liquid drop emitter technique also eliminates a requirement for pressurized ink reservoir or ink pumps. In addition inks may be particulate, such as a magnetic ink, and have particles much greater in size than will pass successfully through a nozzle. Because of the energy focusing or concentrating ability and the absence of nozzles, certain embodiments of the present invention have a clear capacity for much higher drop rates than state of the art drop on command type printers, while retaining the drop on command feature of those same printers.

Figure 1:
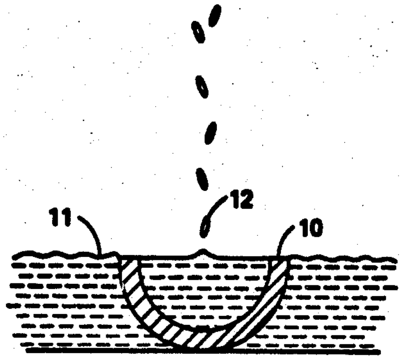
FIG. 1 is an illustration of a curved transducer illustrating the principle of ejecting drops of fluid from the surface of the liquid.

One illustration of the principles involved in the invention is shown in FIG. 1. A hemispherical crystal 10 having segmented electrodes (as illustrated in FIG. 2) is submerged in a liquid 11 and then the crystal is excited with inputs resulting in acoustic radiation up to approximately 60 watts per square centimeter. By operating the crystal at series thickness resonance with various burst lengths and input power, droplets 12 of the liquid can be ejected in a orderly train from the central mound over the central portion of the crystal. These droplets are ejected up to eight inches above the crystal. The drop size is dependent on the crystal thickness resonant frequency by:

$r_o = V/fD$ $r_o$=spot dia. at focus

V=Velocity of sound in XTAL f=resonant XTAL freq.

D=Diameter of XTAL

As the thickness resonance is raised, focusing is improved and smaller drops are formed. It should be noted that in the high energy short duration burst mode, the drop is "pinged" off without raising up a mound of liquid on the surface. The surface waves are significantly reduced.

In order to reduce surface ripple and interference with drop production, a damper plate such as plate 13 shown in FIG. 2 is used. Plate 13 may be a solid or a mesh wire or cloth. The hole in plate 13 is sufficiently large so that the droplets passing therethrough do not contact the plate and the hole does not serve as a nozzle.

Figure 2A:
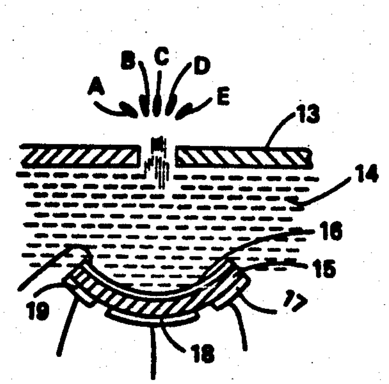
FIG. 2*a* is an illustration of a means to control the direction in which the drop is ejected from the liquid.
Figure 2B:
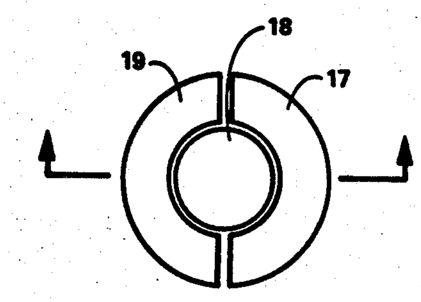
FIG. 2*b* is a bottom view of the transducer of FIG. 2*a* illustrating the contact arrangement.

The direction of the drops "a" through "e" may be controlled by selectively connecting combinations of the electrodes 16–19 attached to the crystal 15. In FIG. 2*c* the drop direction is shown by driving the electrodes in the combinations given in FIG. 2*c*. As shown in FIG. 2*b*, electrodes 17, 18 and 19 are segmented on the spherically curved crystal wherein for example, 18 may be a circular contact wherein, 17 and 19 are semi-circular. FIG. 2*b* is a bottom view of a suggested pattern of three separate electrodes on crystal transducer 15 as seen in FIG. 2*a*. Energization of these electrodes individually or in combination as shown in FIG. 2*c* will change the angle of acoustical radiation pressure at the acoustical focal point relative to the liquid surface and cause droplets to be emitted in a coherent stream in four directions other than normal from the fluid surface as indicated in FIG. 2*a*.

Considering the drop velocity observed of 100 inches per second and the drop diameter generated (0.003 inch), the highest frequency that can be attained before the drops become tangent to one another in the stream is as follows:

drop frequency=drop velocity/drop spacing f=100 in./sec./0.003 in.=33 KHz

Increased radiation pressure and improved fluid properties would raise this limit by increasing drop velocity.

The above discussion is based upon the use of a piezoelectric crystal, however other energy sources could be used for example, mechanical and magnetostrictive.

Figure 3:
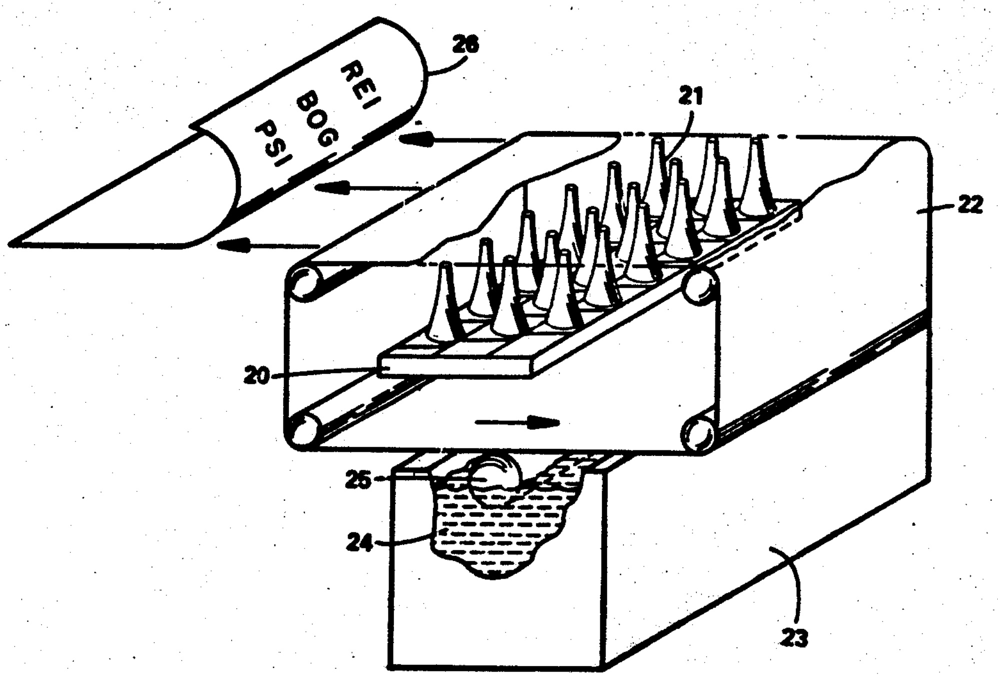
FIG. 3 is one embodiment of invention utilizing the principle of invention wherein multiple acoustic cones are used to eject drops from a moving ink belt.

Implementation of the above mentioned principles may be embodied in the system as shown in FIG. 3. An array of flat piezoelectric crystals 20 has mounted on each individual crystal an acoustical horn 21 which is in contact with a web or belt 22 that is moving across the top of the acoustical horns. Ink 24 held in a reservoir 23 is applied to the belt 22 by roller 25. As the belt passes over the acoustical horn energy is applied thereto in a preselected matter. A thin film of suitable acoustical coupling material of appropriate acoustical impedance is required between, and in contact with, the horn tips and the ink belt. Characters may be imprinted such as shown on sheet 26. It should be noted that the array and acoustical horn structure is enlarged out of proportion in the picture to show detail. In practice the array would be quite small so that it would take a series of horns to produce one character in each row of figures. In operation, pulses applied to each element of the array produces acoustical energy pulses which are concentrated by the acoustical horns. The concentrated pulse ejects ink from the belt 22 onto the document adjacent thereto.

The ink belt ink feed technique offers the highest drop rate production capability because separation disturbance of the thin film ink surface caused by drop ejection is non-existent. As fast as a emitter ejects a drop the moving belt presents the emitter with a fresh uniform film of ink.

The ink belt moves at substantially the same velocity as that of the print surface and in the same direction. For these reasons there is no shearing action to cause splatter or fog upon drop contact since the relatively low velocity drop lands normal to the print surface. Further, the drop experiences no aerodynamic problems because the thin air film through which the drop travels is moving at substantially print surface and ink belt velocity.

The ink carrying surface of the ink belt can be frosted such as is drafting mylar. This holds ink under good thickness control but is not as desirable from an acoustic transmission point of view as a smooth surface. Proper surface tension values of the surface material and liquid along with an appropriate wetting agent to promote uniform sheeting allow use of a smooth surface.

The opportunity for wide band drop production at continuously changing drop frequency exists with the ink belt design by synchronizing crystal drive power and duration with drop frequency.

The system efficiency will affect the maximum drop rate as well as drop size control. Efficiencies are dependent on the system bandwidth and the crystal Q, focusing, ink or fluid parameters, and coupling materials between the crystal and liquid air interface.

The liquid surface tension and mass density greatly affect the power required for drop emission. Water for instance, has a surface tension of about 73 dynes/cm at room temperature with an air interface. Acetone with a surface tension of 24 dynes/cm reduces the force required for emission to one third that of water. 30% acetone added to water in one mixture produced a much stronger emission than for water alone. Particles of dye or magnetic materials also affect the surface tension as well as the mass density.

FIG. 4 illustrates another embodiment in which a piezoelectric crystal, 30, in the shape of a cylindrical segment is mechanically coupled to a wedge shaped concentrator 30A. A thin film of suitable acoustical coupling material is required between the concentrator and the ink belt, 31. This device is suitable as is for producing full bar coding or, if segmented at an appropriate place, 30B, for producing bar/half bar coding. Further appropriate segmentation allows printing of individual characters. Variable bar widths such as are used in UPC (Universal Product Code) bars can be produced.

Another nozzleless utilization of concentrated acoustical energy to emit droplets of ink toward a print surface is illustrated in FIG. 5. A capillary tube 38 resides on a transducer 40. The solid material 39 is used to match impedance between the crystal and liquid as well as a serving as a capillary. Liquid will rise in the capillary tube to meet the liquid level 43 in the reservoir 42 and then a capillary action will cause it to go to the end of the tube. As a burst of energy is applied to the crystal, a drop of fluid will be removed from the tube. A document or paper to be imprinted may be passed over the end of the capillary tube, and as the drop is removed from the end of the tube it will impact the paper making a dot or mark thereon. A row of capillaries may be used and programmed to emit fluid at different points to form alphanumeric characters, bars, or other characters on the paper or document.

An air accumulator 44 is used to accumulate air in the system as well as to damp vibrations in the liquid system.

In one embodiment of the invention (not illustrated), it is not necessary to actually separate a drop of writing fluid from the fluid supply prior to contacting the object on which it is to be deposited. The writing fluid short of producing drops, may be raised into a mound having a generally conical shape when the apex of the cone is adjacent to the writing surface. By increasing and decreasing the energy supplied to raise the writing fluid, the apex of the cone and writing fluid is moved into and out of contact with the writing surface thereby producing a dot or line depending upon the length of time the apex is in contact with the writing surface.

Although it is not illustrated in any of the embodiments, the drops may be electrostatically accelerated and deflected as necessary to extend its range of operation.

Although specific embodiments have been illustrated utilizing the invention to apply drops of ink or other fluid against a surface to form patterns or characters thereon, these illustrations should not be taken in a limiting sense whereby the scope of the invention is limited only by the appended claims attached hereto.

What is claimed is:

1. A nozzleless ink jet printing apparatus wherein controlled drops of ink are propelled from an unbounded ink surface by an acoustical force produced by a curved transducer at or below the surface of said ink, the improvement comprising a homogeneous piezoelectric crystal and means on said crystal for altering the focal point of said crystal to selectively propel said ink drops in a desired direction.

2. The apparatus according to claim 1 wherein said means on said crystal for altering the focal point is a plurality of separate electrode contacts of at least two different shapes.

3. The apparatus according to claim 2 wherein said crystal has one convex surface and one concave surface and said convex surface has three separate electrodes thereon and said concave surface has one electrode thereon.

* * * * *